May 22, 1956 R. A. GAISER 2,746,210
METHOD OF PRODUCING FILMED AND TEMPERED GLASS SHEETS
Filed Dec. 6, 1952 2 Sheets-Sheet 1
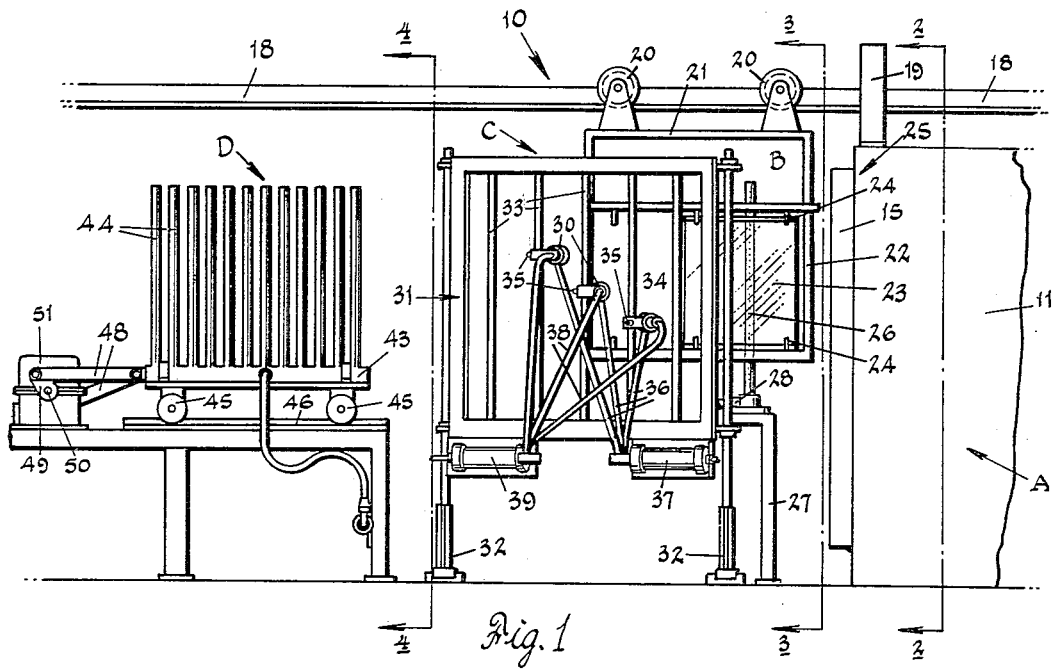
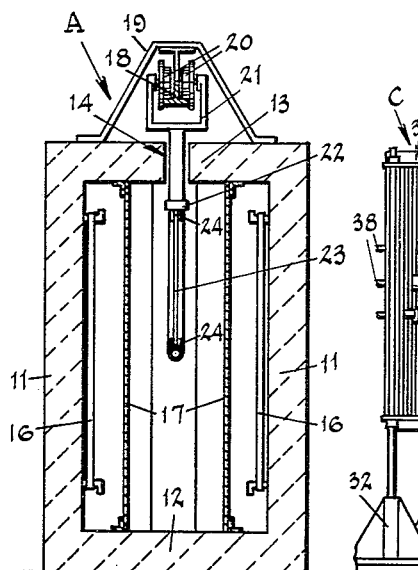
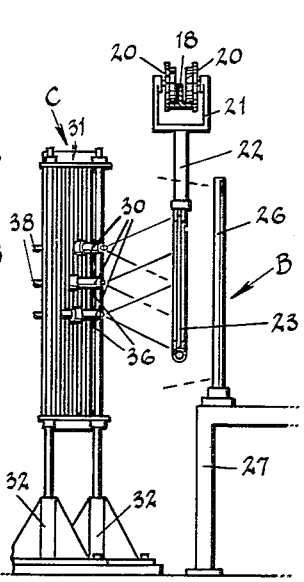
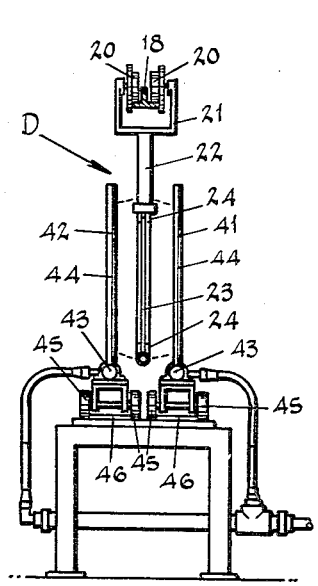
Fig.2　　　Fig.3　　　Fig.4
Fig.8
Inventor
Romey A. Gaiser
By Nobbe & Swope
Attorneys May 22, 1956  R. A. GAISER  2,746,210
METHOD OF PRODUCING FILMED AND TEMPERED GLASS SHEETS
Filed Dec. 6, 1952  2 Sheets-Sheet 2

United States Patent Office 2,746,210
Patented May 22, 1956

2,746,210

METHOD OF PRODUCING FILMED AND TEMPERED GLASS SHEETS

Romey A. Gaiser, Toledo, Ohio, assignor to Libbey-Owens-Ford Glass Company, Toledo, Ohio, a corporation of Ohio Application December 6, 1952, Serial No. 324,573

8 Claims. (Cl. 49—79)

The present invention relates broadly to the filming and tempering of vitreous bodies, and more particularly to a different method and apparatus by means of which improved heat strengthened glass sheets provided with electrically conducting surface films can be produced.

It is already known to provide a transparent, electrically conducting film (such as shown in Patent 2,429,420 to H. A. McMaster, dated October 21, 1947) on glass sheets or plates, by first heating the sheets to substantially their point of softening, then spraying one surface of the hot glass with a tin halide in fluid form and finally cooling the filmed sheet in the atmosphere; and it is also known to chill a heated glass sheet, whether filmed or unfilmed, by blasts or jets of air directed against opposite surfaces thereof to temper it.

However, there have been objections production-wise to the known methods and apparatus for producing tempered glass sheets which carry an electrically conducting film, and to the quality and uniformity of the articles produced thereby.

The seriousness of these objections is due largely to the fact that the expense of producing electrically conducting glass sheets of the above character makes the problem of rejects an unusually disturbing one. Consequently, the discovery of a method capable of invariably producing filmed and tempered glass sheets of commercially acceptable quality, and with a breaking pattern that can be accurately predetermined and consistently reproduced, is of major importance in the industry. And its importance will be even more apparent when it is understood that the widest present use of such strengthened conducting glass sheets is in de-icing windows or windshields of both commercial and military type planes, where they are subjected to very considerable abnormal strains and stresses resulting from their use at high altitudes and in pressurized cabins, and where the treated glass must meet unusually rigid specifications as to electrical and optical properties.

Now it is an aim of this invention to provide an improved method for producing sheets or plates of glass that are filmed on one surface with an unusually clear and transparent, electrically conducting film of relatively low resistivity, and which at the same time, are tempered or heat strengthened in a manner to uniformly exhibit mechanical strength and desirable breaking characteristics that are substantially equal to those of approved three quarters to full heat treated or tempered glass.

Briefly stated, these desirable characteristics are obtained, according to the invention, by first heating the glass sheet to substantially its point of softening, next chilling one side only of the heated sheet, then spraying the opposite side to simultaneously film and chill the same, and finally chilling both sides of the sheet simultaneously.

Another object of the invention is to make it possible to produce a conducting glass sheet of this character which, in addition to excellent electrical, strength and optical properties is also of true shape and substantially free from warp and distortion.

Still another object is the provision of a method capable of accomplishing the above objects which lends itself to continuous line production.

Other objects and advantages of the invention will become more apparent during the course of the following description, when taken in connection with the accompanying drawings.

In the drawings, wherein like numerals are employed to designate like parts throughout the same:

Fig. 1 is a side elevation of a simplified form of one type of apparatus that can be used to carry out the invention;

Fig. 2 is a vertical, sectional view taken through the exit end of the heating furnace, and substantially along the line 2—2 in Fig. 1;

Fig. 3 is a view from line 3—3 in Fig. 1, looking in the direction of the arrows, and showing the preliminary chilling means and the spray means;

Fig. 4 is a view from line 4—4, looking in the direction of the arrows, and showing the final chilling means in end elevation;

Fig. 8 is a sectional view through a representative type of air pipe used in the chilling mechanisms.

Figure 5:
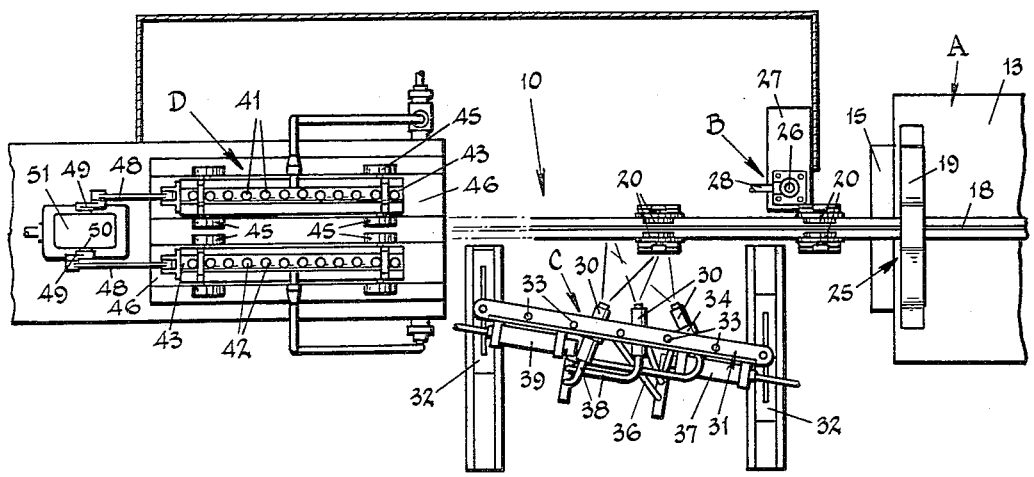
Fig. 5 is a plan view of the apparatus of Fig. 1.

Referring now more particularly to the drawings, there is illustrated in Figs. 1 to 5 one form of filming and strengthening apparatus constructed in accordance with the invention, and which is designated in its entirety by the numeral 10. The apparatus 10 comprises essentially a heating furnace A, a preliminary chilling mechanism B, a spraying or filming mechanism C, and a final chilling mechanism D, all arranged in substantial end to end alignment to act successively on a glass sheet during movement thereof along a definite predetermined path.

As best shown in Figs. 1 and 2, the furnace A is of the rectangular tunnel type made up of side walls 11, bottom wall 12, and a top wall 13 which is provided with a continuous middle slot 14. The furnace is closed at its opposite ends by doors 15, only one of which is shown, and may be heated in any desired manner as by means of ribbon type electrical resistance heaters 16 arranged along the side walls. With this heating arrangement, baffle plates 17 are preferably provided in front of the heaters 16 to give a more uniform heat in the working area of the furnace.

In order to move work through the furnace A and to transfer it from the furnace A, past the preliminary chilling mechanism B, and the spray mechanism C, and into and out of operative relation with the final chilling mechanism D, there is provided a monorail 18, mounted above the slot 14 in the furnace A by brackets 19, and extending outwardly from the furnace to and beyond the final chilling mechanism D.

Movably supported from the monorail 18 by wheels 20 is a carriage 21 from which is suspended a frame 22 adapted to extend downwardly through the slot 14 in the furnace A. A glass sheet 23 to be treated is supported within the frame 22 for slight movement relative thereto by clips, fingers, tongs or the like 24.

The glass sheet 23, after being hung within the frame 22 at the entrance end (not shown) of the furnace A, is introduced into, and passed through, the furnace by movement of the carriage 21 from right to left along the monorail 18. The particular manner of moving the carriage forms no part of this invention. It may be done by hand, or by any known mechanical means, but it will be clearly hereinafter seen that the method and apparatus of this invention lends itself readily to the treatment of a glass sheet or other vitreous body during continuous movement thereof along the monorail 18 from one end of the apparatus to the other.

The speed of travel of the carriage 21, during treatment of the glass, and the temperatures within the furnace A are so controlled that by the time the sheet 23 reaches the exit end 25 of the furnace it has been heated to substantially the softening point of the glass. For example, we have found that a five minute heating cycle with the furnace at 1350° F. will bring a ¼″ thick sheet of soda-lime-silica, ground and polished, plate glass within the proper temperature range for the subsequent treatment.

With the glass sheet at the proper temperature, the door 15 opens and the heated sheet moves therethrough, out of the furnace, and successively past the preliminary cooling mechanism B, the spraying mechanism C and into position to be acted upon by the final cooling mechanism D.

As here shown, the preliminary chilling mechanism B comprises a stationary, perforated, vertically arranged pipe 26 mounted, just outside the furnace A and slightly to the rear of the path of travel of the glass sheet 23, upon a suitable support 27. The pipe 26 is supplied with air under pressure from a conduit 28 and this air is discharged through openings 29 (Fig. 8) in one side of the pipe and against the rear surface of the glass sheet as best shown in Fig. 5.

Figure 6:
Fig. 6 is a diagrammatic, sectional view of a glass sheet after it has been preliminarily chilled.

Passage of the glass sheet past the air pipe 26 will serve to preliminarily chill the rear surface only of the glass sheet and this difference in temperature between the front and rear surfaces will cause the glass to bow slightly as illustrated diagrammatically and in an exaggerated manner in Fig. 6. The degree of chilling and consequently the amount of bow in the sheet can be very accurately controlled by proper regulation of the speed of the glass sheet, pressure of air, size and number of air openings and so forth. To illustrate, when used in connection with the specific heating cycle already described, and the specific spraying data to be hereinafter set forth, good results in treating flat glass sheets are obtained with a three quarter inch air pipe provided with ⅛″ round openings spaced ⅜″ apart and to which air is supplied at pressures of one pound per square inch while the sheet is moving therepast at 72 feet per minute.

From the preliminary chilling mechanism B the sheet moves on past and is acted upon by the spraying mechanism C. As illustrated in Figs. 1 and 3 to 5 of the drawings, this spraying mechanism includes a bank of stationary spray guns 30 mounted in position to direct a uniform coating of atomized liquid filming material over the glass sheet 23 as it moves therepast. To this end there may be arranged beyond the mechanism B and at the opposite side of the path of travel of the glass sheet a suitable framework 31 mounted for sliding movement toward and away from, and for angular movement relative to, the path of travel of the sheet upon slides 32. The framework 31 includes a plurality of vertical rods 33 upon which are mounted, for sliding movement in a vertical plane and for swinging movement in the horizontal, brackets 34 which carry the spray guns 30. The brackets 34 are held in position on the rods 33 by means of set screws 35, and by proper manipulation of the brackets and set screws the guns 30 can be adjusted to positions where they will spray the glass sheet over similar, vertically aligned areas that extend from top to bottom of the sheet as best shown in Figs. 3 and 5.

The stationary spray guns 30 are supplied with atomizing air through conduits 36 from air manifold 37, and with filming liquid through conduits 38 from a source of liquid supply 39. The spray liquid may be any of the materials known to produce electrically conducting films upon contact with a hot glass surface, but in the exemplary set up here being specifically described we prefer to use a 30% solution of SnCl₄ in isopropyl alcohol; and, with the particular furnace and preliminary chilling conditions specifically mentioned heretofore, we have obtained the best spray results with the guns approximately 22 inches from the glass surface and delivering approximately 6 cubic centimeters per second under an atomizing air pressure of 60 pounds per square inch while the sheet is moving past the guns at 43 feet per minute. This will consistently produce clear, transparent electrically conducting films with a resistivity of 70 ohms per square and power constants of .90.

Figure 7:
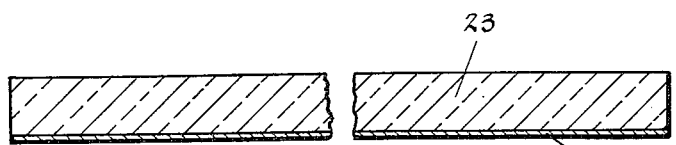
Fig. 7 is a fragmentary, sectional view through a finished tempered and conducting glass sheet.

Moreover, in addition to filming the glass, during passage of the sheet past the bank of spray guns 30 the action of the spray will also function to chill the filmed surface of the glass and so to overcome or counteract the bowing action of the preliminary chilling treatment and return the sheet to its original shape. Thus, as shown in Figs. 6 and 7, the glass 23 after passing the preliminary chilling mechanism B will be slightly bowed as shown in the former figure, but upon continuation of its forward movement past the spraying mechanism C, the glass sheet will not only have been provided with an electrically conducting film 40 but will have been returned to its original condition, which may be flat (as shown in Fig. 7) in the case of an originally flat sheet or differently bowed in the case of a sheet that was originally curved.

Continued movement of the glass sheet past the spraying mechanism will bring it into position for final chilling between the spaced heads 41 and 42 of the mechanism D where it is subjected to blasts of moving air directed against opposite surfaces simultaneously.

This final chilling apparatus may be of conventional construction and operation but, as here shown, comprises a pair of air manifolds 43 provided with a series of upwardly extending perforated air pipes 44 and mounted for reciprocal movement on wheels 45 running on tracks 46. The pipes 44 are similar in construction to the single pipe 26 of the preliminary chilling mechanism B and are provided with the same spaced round holes 29 shown in Fig. 8.

The air manifolds 43 are caused to reciprocate in opposite direction along the tracks 46 by means of arms 48 connected to cranks 49 which are keyed in opposed relation to opposite ends of a shaft 50 that is adapted to be rotated from a suitable drive mechanism 51. With chilling heads of the size illustrated in the drawings, it will be necessary to stop the glass sheet between the heads during the final chilling operation but, by the use of longer heads it is possible to continue the movement of the glass during final chilling so as to make the entire operation continuous from the time the untreated sheet enters the furnace A until the completely filmed and tempered sheet leaves the final chilling mechanism D.

It will also be apparent that any one of the conditions enumerated above as specific examples in connection with the operation of the furnace, preliminary chilling mechanism, spraying mechanism or final chilling mechanism can be altered one way or the other if desired, and that such an alteration will make possible, and indeed will usually necessitate, a compensating alteration in one or more or all of the other specific conditions.

In fact, it is to be understood that the form of the invention herewith shown and described is to be taken as an illustrative embodiment only of the same, and and that various procedural changes may be resorted to without departing from the spirit of the invention or the scope of the subjoined claims.

I claim:

1. In a method of producing filmed and tempered glass sheets the steps of heating the sheet to substantially the softening point of the glass, then chilling one surface only of said heated sheet, next simultaneously filming and chilling the opposite surface of the sheet without positively chilling said one surface, and finally chilling both surfaces of the filmed sheet simultaneously.

2. In a method of producing filmed and tempered glass sheets the steps of heating the sheet to substantially the softening point of the glass, then blowing a cooling fluid against one surface only of the heated sheet to preliminarily chill the same, next discontinuing the chilling of said surface and spraying the opposite surface of said sheet with a fluid that will produce an electrically conducting film upon contact with hot glass to simultaneously film and chill the same, and finally blowing a cooling fluid against both surfaces simultaneously to temper the glass.

3. In a method of producing tempered glass sheets provided with an electrically conducting film the steps of heating the sheet to substantially the point of softening of the glass, then blowing air against only one surface of the heated sheet to preliminarily chill the same, next spraying the opposite surface of said sheet with a solution of a tin compound to simultaneously film and chill the same, and finally blowing air against both surfaces simultaneously to temper the glass.

4. A method of producing tempered glass sheets provided with an electrically conducting film which comprises passing the sheet to be treated successively through a heating area, a preliminary chilling area, a filming area and a final chilling area, heating said sheet to substantially the point of softening of the glass while in said heating area, subjecting the heated sheet to a series of closely spaced air blasts extending across one surface of the sheet while in said preliminary chilling area, directing a series of atomized tin compound sprays extending across the sheet against the opposite surface thereof while the sheet is in said filming area, and directing blasts of air against both sides of said sheet while it is in said final chilling area.

5. In a method of producing filmed glass sheets in which the film is produced by the reaction of the filming material with a glass surface that has been heated to substantially the softening point of the glass, the steps of preliminarily chilling only one surface of said sheet after said heating step, and then spraying the opposite surface with the filming material while said surface is still in its heated condition.

6. A method of producing tempered glass sheets provided with an electrically conducting film which comprises moving the sheet to be treated along a definite predetermined path and first through a heating furnace, then past a source of compressed air directed toward said path from one side only thereof, then past a source of filming solution being sprayed toward said path from the opposite side thereof and that will react with hot glass to form an electrically conducting film, and finally between sources of compressed air directed toward said path from both sides thereof.

7. In a method of producing filmed and tempered glass sheets the steps of heating the sheet to substantially the softening point of the glass, then progressively chilling one surface only of said heated sheet along a restricted area extending from one edge of said sheet to another, and progressively filming and chilling the opposite surface of said sheet also along a restricted area extending from one edge of the sheet to another, while maintaining one of said areas in advance of and spaced from the other.

8. In a method of producing filmed and tempered glass sheets the steps of heating a sheet to substantially the softening point of the glass, then applying a cooling fluid to one surface only of the heated sheet along a band extending from edge to edge of said sheet and moving from a leading to a following edge thereof to preliminarily chill the same, and following said application by applying a filming fluid at a temperature appreciably less than that of the glass to the opposite surface of the sheet along a band extending from edge to edge of said sheet and moving from said leading to said following edge thereof.

References Cited in the file of this patent

UNITED STATES PATENTS

| | | |
|---|---|---|
| 1,960,222 | Long | May 22, 1934 |
| 2,093,040 | Eckert | Sept. 14, 1937 |
| 2,236,911 | Long | Apr. 1, 1941 |
| 2,285,595 | Littleton et al. | June 9, 1942 |
| 2,478,817 | Gaiser | Aug. 9, 1949 |